United States Patent Office

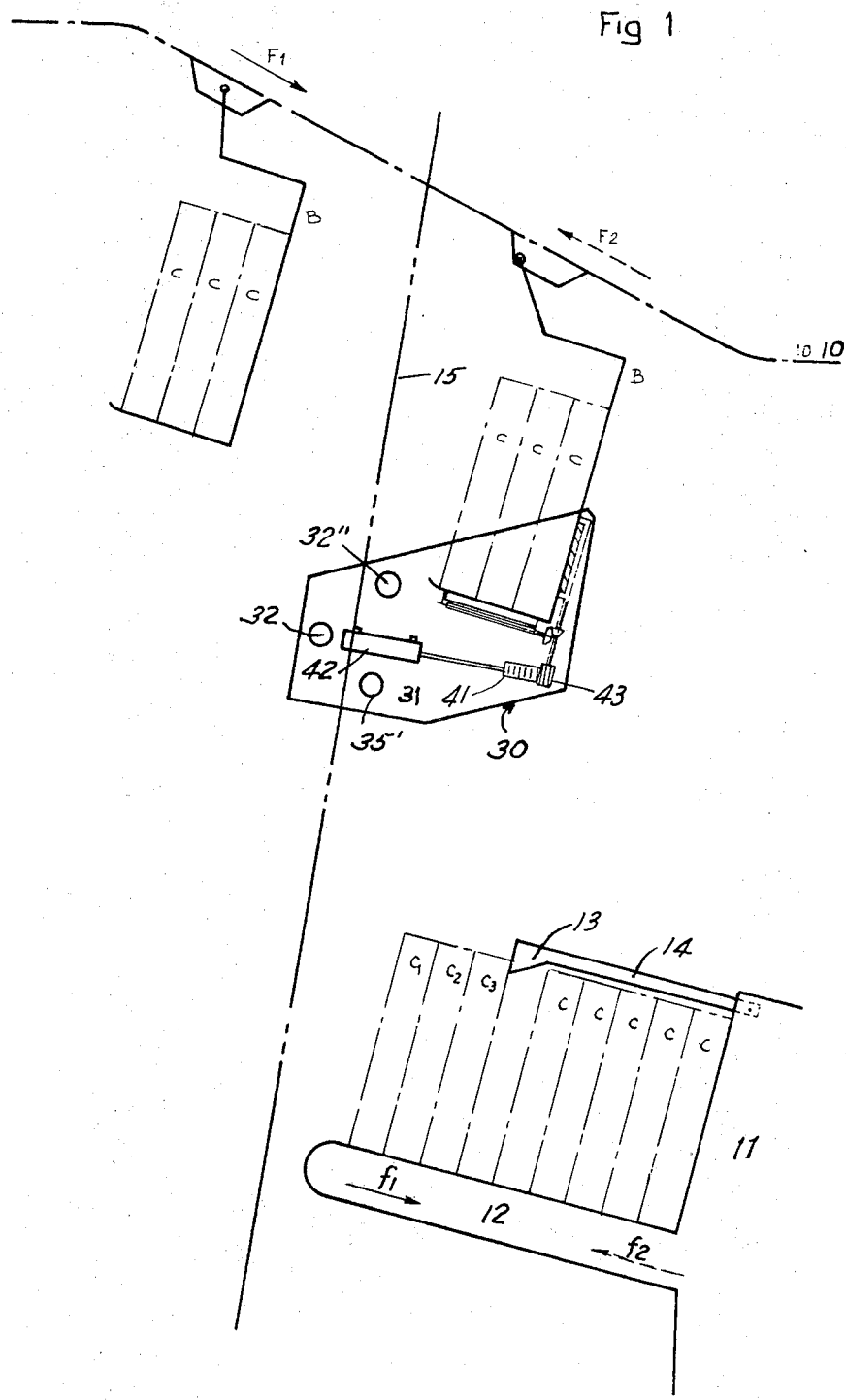

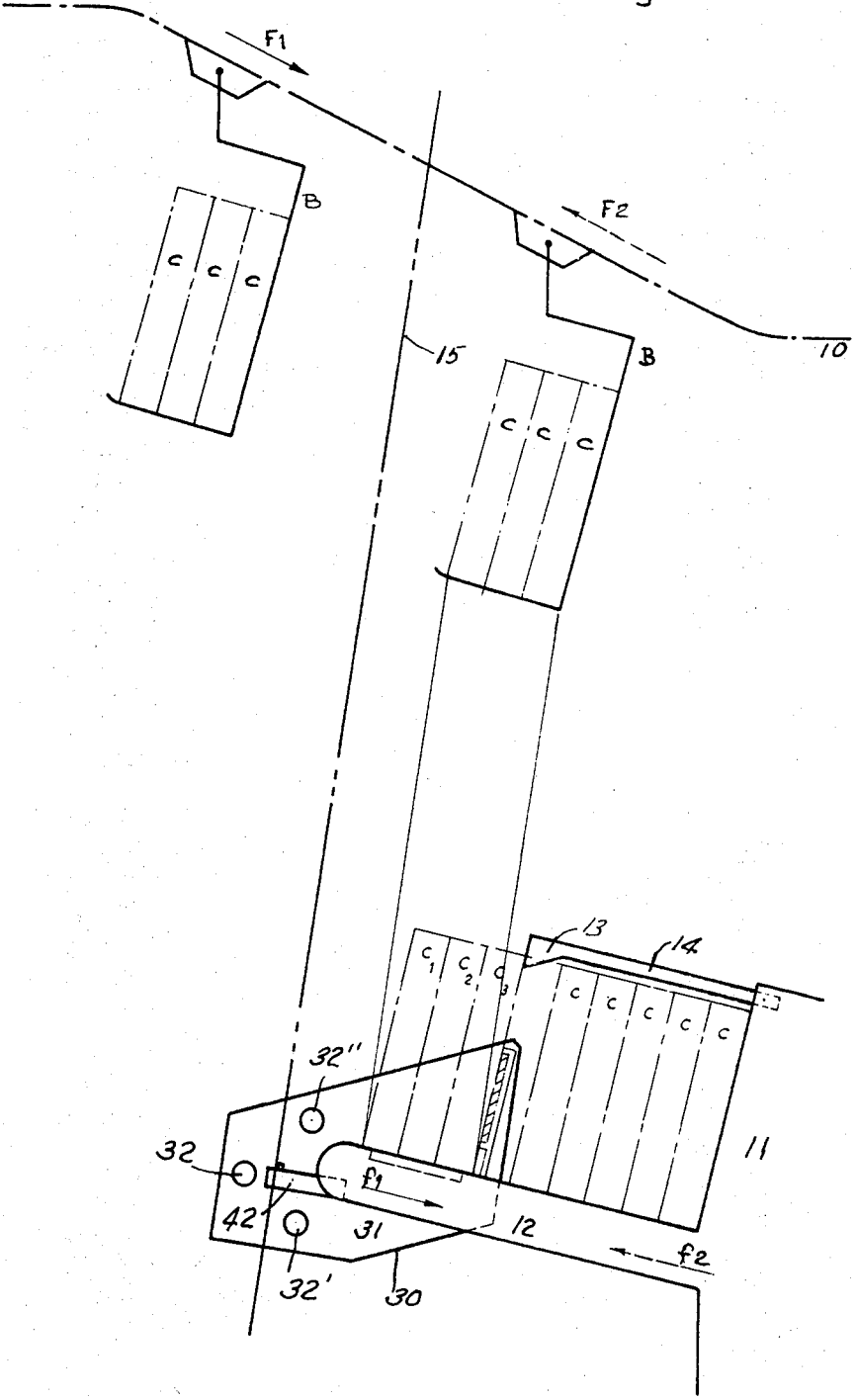

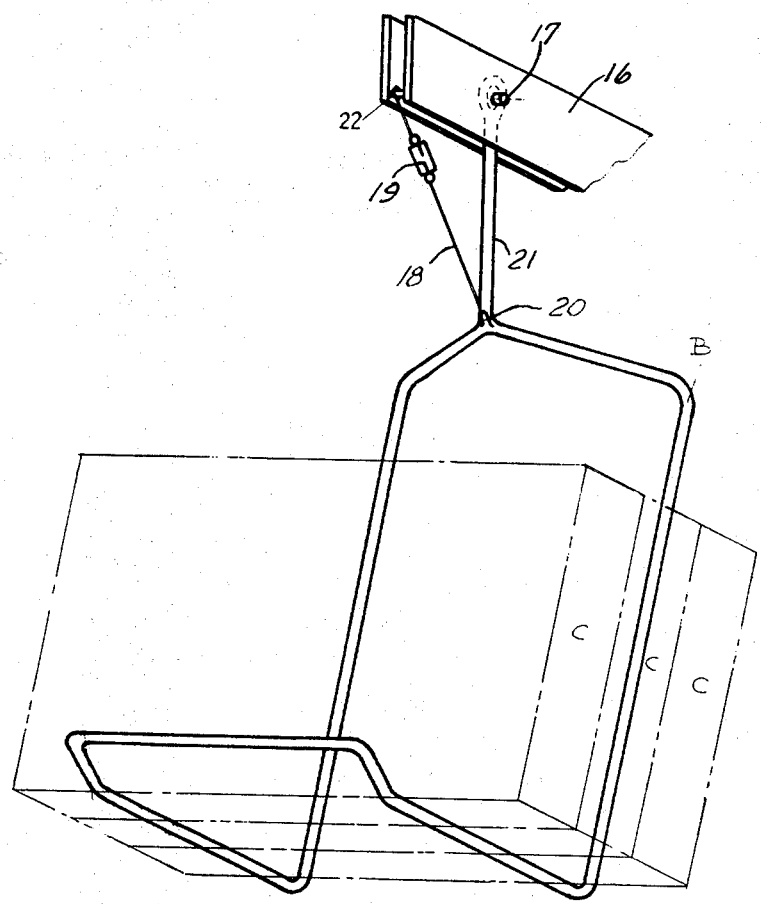

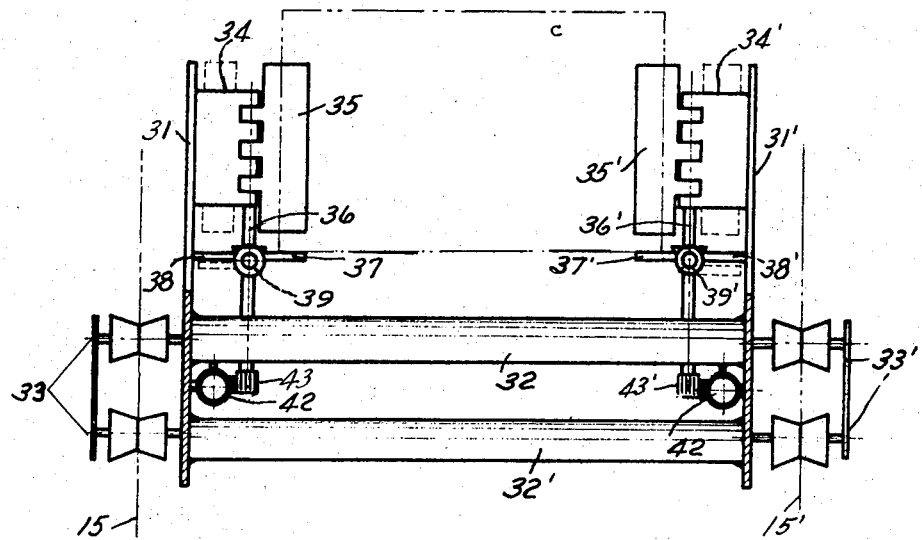
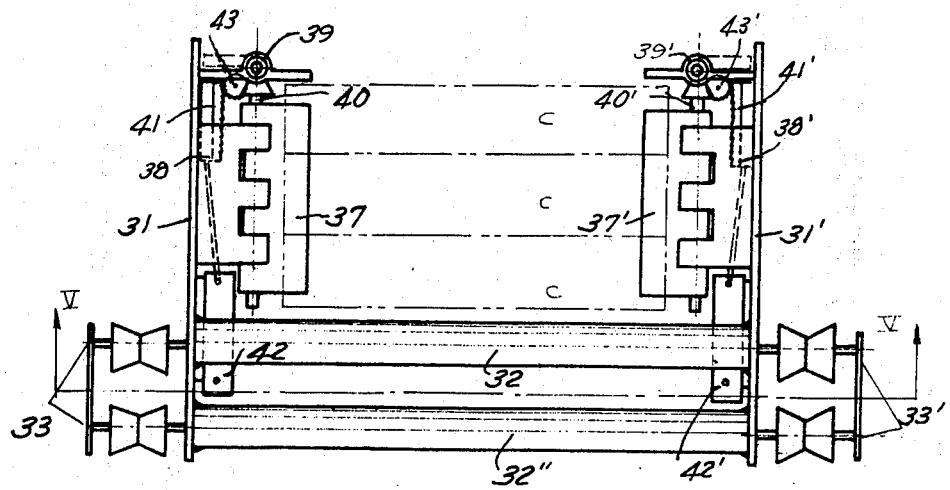

3,534,876
Patented Oct. 20, 1970

3,534,876
LOAD-TRANSFER SYSTEM
René Bornstein, Antony, and Gérard Dubus, Combs-la-Ville, France, assignors to Service d'Exploitation Industrielle des Tabacs et des Allumettes, Paris, France, a French public establishment
Filed Nov. 17, 1967, Ser. No. 683,972
Claims priority, application France, Nov. 18, 1966, 84,189
Int. Cl. B65g *17/20, 47/26*
U.S. Cl. 214—89         5 Claims

ABSTRACT OF THE DISCLOSURE

A system for transferring loads between open supports moving along a predetermined path and at least one lower support, of the type comprising at least one relay support which is guided in such a manner as to permit of its being moved alternately on the one hand into the zone of displacement of said open supports and on the other hand at the level of said lower support, said relay support comprising carrying members for maintaining loads in equilibrium under the action of their own weight and means for withdrawing said carrying members from the space which is swept by said loads which rest on said open supports.

---

One of the objects of the invention is to permit the use of an overhead conveyor for transporting products from one group of production stations to another group of work stations without requiring any manual intervention either for loading or unloading the conveyor and without stopping the motion of supports such as pivoted carriers.

A further object of the invention is to permit the operation of the system in conjunction with means for selecting the pivoted carrier to be loaded or the carrier to be unloaded from a continuous sequence of moving carriers.

The system in accordance with the invention is preferably applicable to products which have sufficient rigidity and some dimensions of which are relatively constant. It is pointed out that these characteristics can be inherent to the containers employed for the purpose of handling manufactured products and that it is not necessary to ensure that each batch handled is a coherent assembly. Each batch can be constituted by a number of objects varying between one unit and a maximum number.

One example which provides a particularly clear illustration of the potentialities of the invention is the handling of the so-called "trays" which are employed for the purpose of conveying cigars or cigarettes between the forming machines and the wrapping or packing machines.

The trays referred-to usually have two open faces and it is essential during transportation and especially at the time of transfer of said trays from one support to another to maintain the trays at a well-determined angle of inclination in order to prevent the articles contained therein from sliding over each other. There thus appears a further object of the invention, which consists in maintaining the manufactured products in the most favorable state of equilibrium, so that the system in accordance with the invention is particularly well suited to the handling of fragile objects. These results have been achieved by endeavoring to support the products in specially shaped cradles and by avoiding any violent action while one cradle is being replaced by another.

The means employed are suitable both for loading and unloading of the pivoted carriers and for discharging products at production stations or taking them from said stations.

These means make it possible to employ similar equipment for these different handling operations, thereby securing all the advantages attached to large-scale production when the loading and unloading stations are increased in number.

It is known to unload moving supports such as the pivoted carriers of overhead conveyors or the pans of noria-type conveyors by interposing on their paths obstacles which permit the passage of the supports and prevent the passage of the loads being transported. The obstacles referred-to can be stationary and then initiate the extraction of all loads which pass through their zone of action; these loads must then be removed at a rate which is at least equal to that of the rate of transportation by the moving supports. It is also known to make use of obstacles which can be displaced outside their zone of action in order to permit of selective unloading and at a rate which is lower than the transportation rate; but these movements of displacement must be carried out within the time interval which corresponds to the absence of a load within the zone of action of said obstacles. This condition entails complicated control systems between the mechanism for setting the moving supports in motion and producing the displacement of the obstacles.

The system in accordance with the present invention comprises means whereby the support of the aforesaid obstacles is permitted to penetrate into and to remain within their zone of action and remotely controlled means for placing said obstacles in an inoperative position and then bringing them into an operative position in a rapid and reliable manner as soon as the desired load comes in proximity, the displacement of the obstacles and of the load away from the zone of action being carried out immediately after the unloading operation has taken place.

Preferably, the system is arranged so as to carry out a smooth transfer process in such a manner that, at the moment of transfer, the load is either moving upwards or downwards according to the direction of transfer.

These same obstacles can also subsequently serve to support the load during its transfer up to a discharge location. The system in accordance with the invention permits the use of the obstacle support as a means for conveying and discharging onto another support a load which has been taken from a moving support. Obstacles which have already served as intermediate supports and which are put in the inoperative position are accordingly permitted after discharge to move over a return path of travel which is the exact opposite of the outgoing path of travel while avoiding the load which has been discharged. Said load may thus remain stationary in the discharge zone without immobilizing the intermediate transfer support. This latter is immediately released and can move back to take a further load from a support of the first type. When subsequently stopped in an intermediate position between the loading zone and unloading zone, the intermediate support constitutes a reserve which can rapidly be employed.

It is also known to lift a load from its support by inserting beneath said load an arm such as a shovel or preferably two arms on each side of the vertical line of the center of gravity of the load. This is possible in particular each time the shape of the load or of its support permits the penetration of said arms as a result of their displacement in a direction in the vicinity of the horizontal. However, in the case of a load which is not only placed on its support but which, for the sake of stability, must also be supported on one side, it has been found impracticable to operate in this manner without permitting a tilting motion either prior to lifting or after lifting. If the nature of the load was such as to prohibit such a tilting motion, the sole permissible expedient was to hold the load by gripping it on its free sides, which is not suitable in the case of articles which are either fragile or have no elasticity. On moving supports, picking up by lateral gripping would also presuppose strict accuracy of synchronization.

The present invention makes it possible to transfer a load from a first support having the shape of a dihedron on which a load is both laid and supported at the rear to a second support having the same shape and consisting of groups of obstacles whether movable or not which serve to maintain the orientation of the load during its subsequent displacement.

Preferably, the system in accordance with the invention will be so arranged as to carry out the transfer by means of a relative translational motion of two supports. The resultant of the forces imparted to the load by the support to be loaded is comprised within the space delimited by the recessed portions of the supports and directed towards the openings of said recessed portions.

One example of execution of the invention is described hereunder in regard to a system for transferring a group of cigarette trays between an overhead conveyor and a machine for utilizing or filling said trays. This example is illustrated in the accompanying drawings, in which:

FIG. 1 is a diagrammatic view of the complete system in elevation and in partial cross-section;

FIG. 2 is a view which is similar to that of FIG. 1 in another stage of operation of the system;

FIG. 3 is a view in perspective of a pivoted carrier of the overhead conveyor;

FIG. 4 is an overhead view of the relay support which is employed for the purpose of transferring trays;

FIG. 5 is a view of said support as shown in cross-section along the line V—V of FIG. 4.

In FIGS. 1 and 2, there is shown diagrammatically at 10 a portion of the carrying track of the overhead conveyor on which the pivoted carriers B are adapted to run, one of said carriers being illustrated in detail in FIG. 3. Each carrier is intended to carry a group of trays C which, in the example shown, consists of three units; but this number can vary from one production line to another and even within the scope of the same production line. The direction of motion of the pivoted carriers is indicated by the arrows $F_1$ and $F_2$.

The arrow $F_1$ corresponds to the utilization of the overhead conveyor for the purpose of supplying empty or filled trays to the machine 11. There is shown at 12 the belt conveyor which operates in the direction of supply to said machine 11 as shown by the arrow $f_1$.

The arrow $F_2$ indicates the direction of travel of the pivoted carriers B when the overhead conveyor serves for the removal of trays which have been restored by a machine such as the machine 11. The belt conveyor 12 then operates in the discharge direction as shown by the arrow $f_2$.

It is clear from the drawings that the trays are inclined to the vertical. By virtue of this sloping position, the cigarettes are retained in the trays and applied at one end against the large face or rear wall of each tray, even when they are subjected to a number of shocks during handling. It will be noted that, in the transfer region, the track of the overhead conveyor is constructed with either a downward or upward slope depending on the direction of travel. The angle made by this track with the horizontal is always greater than the angle made by the large faces of the trays with the vertical. This condition must be complied with in order that the transfer of trays from the carriers to the intermediate support or conversely should take place without sliding. The difference in magnitude of the two angles can also be small, namely of the order of a few degrees.

On the belt conveyor 12 of the machine 11, the inclination of the trays is shown to be the same as that of the pivoted carriers, although there would be no serious objection to a difference of a few degrees.

On the other hand, it is necessary for the operation of the system to make provision on the belt conveyor 12 for a free space between the end group of trays which has just been unloaded or which has to be taken away by the relay support 30 and the trays which constitute a reserve for supply to or discharge from the machine. The space referred-to can be provided by means of abutment members shown at 13 in FIGS. 1 and 2 which are fixed to the control arms 14.

The transfer unit proper is constituted by a relay support which is designated by the general reference 30. This support is shown in its top position in FIG. 1 and in the immediate vicinity of its bottom position in FIG. 2. Said support is capable of travelling between these two positions on a material track which is indicated at 15 under the control of a mechanism which is not illustrated in the drawings and can be either mechanical or hydraulic. The support can also be stopped in an intermediate position.

In the example shown, the material track 15 guides the relay support 30 on a rectilineal path. In order to effect a transfer of trays without sliding against the stop 13 either away from or towards the belt conveyor 12, the path referred-to is provided in the vicinity of said conveyor with an inclination to the vertical which is smaller than the inclination of the large faces of the trays. Thus, the rear tray-wall $C_3$ which is located on the right-hand side of each tray as shown in the figures move either into contact with or away from the stop 13 at the moment when the rear tray-walls either reach or leave the belt conveyor 12.

The relay support 30 for a group of trays is shown in greater detail in FIGS. 4 and 5. Said support is mainly composed of a rigid frame which carries on the one hand the translation carriages and on the other hand the tray-carrying elements. In the design which is illustrated, the frame comprises two symmetrical side-plates 31 and 31' formed of plate metal and maintained at a constant distance by the three tubular braces 32, 32' and 32''. The assemblies 33 and 33' represent the carriages which enable the support to be guided in translational motion between its end positions along the upright tracks 15 of the system in the same manner as has already been described in U.S. patent application Ser. No. 570,321 of Aug. 4, 1966.

On the inside of the side-plates 31 and 31', there are welded in oppositely-facing relation flat support brackets 34 and 34' which are slightly inclined to the vertical as well as support brackets 38 and 38' in a plane at right angles to that of the support brackets 34 and 34'. Flaps 35 and 35' are hinged on the support brackets 34 and 34' by means of pins 36 and 36'. Similarly, flaps 37 and 37' are hinged on the support brackets 38 and 38' by means of the pins 40 and 40'. The orthogonal pins 36 and 40 on the one hand, 36' and 40' on the other hand are coupled in rotation by means of bevel gears 39 and 39', are rotatably mounted in the corresponding support brackets, and are accompanied in their motion by the hinged flap which is attached thereto. This movement of rotation can be produced, for example on the extensions of the pins 36 and 36', by double-acting jacks 42 and 42' carried by the side-plates 31 and 31' and by means of racks 41 and 41' which are adapted to engage with pinions 43 and 43'.

It can very easily be understood that, since the jacks 42 and 42' are supplied with compressed air in order to draw the racks 41 and 41' in the downward direction of FIG. 4, the pins 36 and 36' move the flaps 35 and 35' up to the position shown in chain-dotted lines in FIG. 5 whilst the flaps 37 and 37' will also take up a position as shown in the same manner in which they are folded back against the support brackets 38 and 38' by means of bevel gears 39 and 39' and pins 40–40'. The supply to the jacks 42 and 42' in opposite directions returns the flaps 35, 35', 37 and 37' to the active position shown in full lines which corresponds to the support of the groups of trays C shown in chain-dotted lines.

The operation of the apparatus can readily be understood and can be adapted to partly manual operation as well as to integral automation. This latter only entails the control of the movements of the support 30 and of the operation of the flaps by the jacks 42 and 42′ in dependence on different presence or absence detectors which can readily be provided in the present state of the art. Only a semi-automatic mode of operation will therefore be described below; first in regard to the loading of pivoted carriers and then in regard to the unloading of said carriers.

In the first case, it should be pointed out that the movements of the overhead conveyor and of the belt conveyor 12 are given by the arrows $F_1$ and $f_1$. As stated earlier, the pivoted carriers are endowed with continuous motion which is in the downward direction in each unloading zone. The intermediate support 30 which is empty is moved to the top of its travel along the track 15 with its flaps folded back against the support brackets, that is to say in the inactive position. It will be noted that this position can be taken up as soon as the intermediate support 30 is discharged of its trays without synchronism with the motion of the pivoted carriers, thereby simplifying the control system. It is then easy to produce the movement of extension of the flaps 35, 35′, 37 and 37′ to the active position in the free space which precedes the passage opposite to the intermediate support 30 of a pivoted carrier which is conveying a group of trays to be supplied to the machine 11. The rapidity of action of the compressed-air jacks 42 and 42′ is a safety factor for this operation. When the pivoted carrier under consideration passes through the position taken up by the intermediate support 30, the trays being transported come into contact with the four flaps of said support and will leave the carrier which then continues its downward travel. As soon as the carrier has moved forward over a given distance after completion of this transfer process, the intermediate support 30 is then lowered along the track 15 with a view to moving the trays away from the space which is swept by the pivoted carriers. The support can then be stopped at an intermediate location between the position shown in FIG. 1 and the position shown in FIG. 2, thus constituting an immediately available reserve for the machine 11.

In order to ensure the supply of the machine, it must be ensured that no tray is present on the input side of the stop 13 (namely on the left-hand side of the stop in the figures). Subject to this condition, the displacement of the intermediate support 30 to its bottom position (as shown in FIG. 2) will initiate the transfer of a group of trays onto the end of the belt conveyor 12. The jacks 42–42′ are supplied for the purpose of returning the flaps to their folded-back position against their support brackets, thus permitting the upward movement of the support 30 to the top position thereof while awaiting a further group of trays to be intercepted.

Loading of carriers from a production machine or with empty trays entails a similar process but in reverse. The movement of the different members is indicated by the arrows $F_2$ and $f_2$. The support 30 which is in the empty condition with the flaps folded back is brought into the bottom position even if trays are present on the left-hand side of the stop 13. As the support moves upwards with the flaps in their active positions, it takes trays which are selected by said stop and frees the place which they had occupied. The support is then stopped in the loaded condition and in the intermediate position until an empty carrier is indicated. The intermediate support then moves upwards into the free space which precedes said carrier and when the position of this latter coincides with the top position of the support 30, said carrier takes the trays in its upward motion, thereby immediately permitting the folding-back movement of the flaps against their support brackets and the displacement of the intermediate support along its entire path of travel. It is apparent that the mobility of the flaps makes it possible to perform different sequences of operations with maximum effectiveness and endows the process with a high degree of flexibility.

It will already have been noted that the transfer of trays from the pivoted carriers to the intermediate support 30 and conversely takes place with a correspondingly greater degree of smoothness as the flaps of said support 30 are located in planes which are parallel to those defined by the stirrup-piece of each carrier. However, this condition may no longer be satisfied in the event of random orientation of the stirrup-pieces resulting from oscillatory movements of pivoted carriers about their suspension pins, as might conceivably occur, for example, when a carrier passes through a curved section of the track 10, or if appreciable differences were to exist in the weights of loads carried. An expedient has accordingly been devised within the scope of the invention in order to forestall this danger, as will now be explained.

The device which is shown in FIG. 3 essentially consists of a tie 18 whereby a lug 20 fixed on the suspension rod 21 of the pivoted carrier is coupled to a point 22 which is integral with the traction system 16 of the overhead conveyor. The suspension pin 17, the fastening lug 20 and the point 22 are the three apices of a triangle, the two sides 17–20 and 17–22 of which are of invariable length on a rectilineal track section. The tie 18 is not rigid (a length of cable or chain, for example) but does not exhibit any appreciable elongation when subjected to tension. A tensioning device such as the turnbuckle 19 serves to determine the exact length of said tie. In the inclined sections of the track 10 in which it is desired to prevent any swinging motion of the pivoted carriers, the point 22 is always located upstream of the inclined section in such a manner as to ensure that the component of the weight of the carrier which passes through the points 20 and 22 has the effect of stressing the tie 18. It is therefore apparent that, whatever the weight carried by the pivoted carrier, its angle of inclination is thus determined with the requisite degree of precision. The angle made by the suspension rod 21 with respect to the vertical in inclined track sections need in any case be only of a very small order.

What we claim is:

1. A system for transferring loads between open supports moving along a predetermined path and at least one lower support having a supporting zone for said loads, said system comprising at least one relay support movable between a first position located on said path and a second position located on said supporting zone of said lower support, first means for moving said relay support from one to the other of said first and second positions, movable carrier members on said relay support said carrier members having at least one active position and one inactive position, said carrier members being adapted when in said active position to take said loads from said open supports and to support the same, and when in said inactive position to permit said open supports with said loads carried thereby to freely move on said predetermined path when said relay support is located on said first position, and second means for moving said carrier members from one to the other of said active and inactive positions.

2. A system in accordance with claim 1, wherein said movable carrier members when in said inactive position are spaced from said loads on said supporting zone when said relay support is located on said second position.

3. A system in accordance with claim 2, wherein said carrier members comprise two pairs of retractable rotatable flaps, one of said pairs of flaps forming a stop and a rear support and the other of said pairs of flaps forming a lower support for said loads when said relay support is located on said first position and one of said open supports with said loads carried thereby reaches said first position on said predetermined path.

4. A system in accordance with claim 2, wherein the carrier members are flaps which are rotatably mounted on said relay support.

5. A system in accordance with claim 1, wherein said carrying members are adapted to be applied against portions of a load which do not project from a moving open support.

References Cited

UNITED STATES PATENTS 2,790,567   4/1957   Rockhill _____ 214—95

RICHARD E. AEGERTER, Primary Examiner

U.S. Cl. X.R.

198—20: 214—59